(12) United States Patent
Kagarlitsky et al.

(10) Patent No.: US 8,989,446 B2
(45) Date of Patent: Mar. 24, 2015

(54) CHARACTER RECOGNITION IN DISTORTED IMAGES

(75) Inventors: Sefy Kagarlitsky, Tel-Aviv (IL); Joseph Rubner, Shoham (IL); Nir Avrahami, Herzliya (IL); Yohai Falik, Ra'anana (IL)

(73) Assignee: RTC Vision Ltd., Kibbutz Givat Hashlosha (IL)

( * ) Notice: Subject to any disclaimer, the term of this patent is extended or adjusted under 35 U.S.C. 154(b) by 0 days.

(21) Appl. No.: 13/993,276

(22) PCT Filed: Jan. 18, 2012

(86) PCT No.: PCT/IB2012/000065
§ 371 (c)(1),
(2), (4) Date: Jun. 11, 2013

(87) PCT Pub. No.: WO2012/098452
PCT Pub. Date: Jul. 26, 2012

(65) Prior Publication Data
US 2013/0279759 A1    Oct. 24, 2013

Related U.S. Application Data

(60) Provisional application No. 61/433,544, filed on Jan. 18, 2011.

(51) Int. Cl.
*G06K 9/00* (2006.01)
*G06K 9/62* (2006.01)

(52) U.S. Cl.
CPC ............ *G06K 9/6202* (2013.01); *G06K 9/6203* (2013.01); *G06K 2209/01* (2013.01)
USPC ........................................ 382/105

(58) Field of Classification Search
CPC .................................................. G06K 2209/15
USPC ......................................................... 382/105
See application file for complete search history.

(56) References Cited

U.S. PATENT DOCUMENTS

| 4,567,609 A | 1/1986 | Metcalf |
| 4,817,166 A | 3/1989 | Gonzalez et al. |

(Continued)

OTHER PUBLICATIONS

Zhou Wang; Bovik, A.C., "A universal image quality index," Signal Processing Letters, IEEE , vol. 9, No. 3, pp. 81,84, Mar. 2002.*

(Continued)

*Primary Examiner* — Sumati Lefkowitz
*Assistant Examiner* — Thomas A James
(74) *Attorney, Agent, or Firm* — Lowenstein Sandler LLP; Ariel Reinitz

(57) ABSTRACT

Systems and methods are provided for recognizing characters within a distorted image. According to a one aspect, a method for recognizing one or more characters within a distorted image includes rendering one or more imitation images, the imitation images including simulations of the distorted image, applying one or more distortion models to the imitation images, thereby generating distorted imitation images, comparing the distorted imitation images with the distorted image in order to compute similarities between the distorted imitation images and the distorted image, and identifying the characters based on the best similarity. According to other aspects, the systems and methods can be configured to provide recognition of other distorted data types and elements.

21 Claims, 5 Drawing Sheets

(56) References Cited

U.S. PATENT DOCUMENTS

| | | | |
|---|---|---|---|
| 4,878,248 | A | 10/1989 | Shyu et al. |
| 5,081,685 | A | 1/1992 | Jones, III et al. |
| 5,136,658 | A | 8/1992 | Mori |
| 5,315,664 | A | 5/1994 | Kumagai |
| 5,651,075 | A | 7/1997 | Frazier et al. |
| 5,848,197 | A | 12/1998 | Ebihara |
| 6,339,651 | B1 | 1/2002 | Tian et al. |
| 6,473,517 | B1 | 10/2002 | Tyan et al. |
| 6,754,369 | B1 | 6/2004 | Sazawa |
| 7,339,495 | B2 | 3/2008 | Kavner |
| 8,446,433 | B1 * | 5/2013 | Mallet et al. .................. 345/647 |
| 2004/0170328 | A1 | 9/2004 | Ladwig |
| 2005/0029347 | A1 | 2/2005 | Noble et al. |
| 2005/0084134 | A1 | 4/2005 | Toda |
| 2005/0180632 | A1 * | 8/2005 | Aradhye et al. ............. 382/182 |
| 2008/0212837 | A1 | 9/2008 | Matsumoto et al. |
| 2009/0175513 | A1 * | 7/2009 | Bolle et al. ................... 382/125 |
| 2009/0222116 | A1 * | 9/2009 | Kang et al. ..................... 700/94 |
| 2010/0014782 | A1 | 1/2010 | Fero et al. |
| 2010/0081416 | A1 * | 4/2010 | Cohen ........................ 455/414.1 |
| 2010/0177169 | A1 | 7/2010 | Saric |
| 2010/0278436 | A1 * | 11/2010 | Tsai et al. ..................... 382/209 |
| 2012/0092329 | A1 * | 4/2012 | Koo et al. ..................... 345/419 |
| 2012/0170835 | A1 * | 7/2012 | Wang et al. ................... 382/159 |
| 2012/0201476 | A1 * | 8/2012 | Carmel et al. ................ 382/239 |
| 2013/0121525 | A1 * | 5/2013 | Chen et al. .................... 382/100 |

OTHER PUBLICATIONS

Naito, T.; Tsukada, T.; Yamada, K.; Kozuka, K.; Yamamoto, S., "Robust license-plate recognition method for passing vehicles under outside environment," Vehicular Technology, IEEE Transactions on, vol. 49, No. 6, pp. 2309,2319, Nov. 2000.*

International Search Report and Written Opinion dated Jun. 1, 2012 for PCT/IB2012/000065.

* cited by examiner

Example 1 (one frame, JPEG quality 15):

| Distorted image (183) | 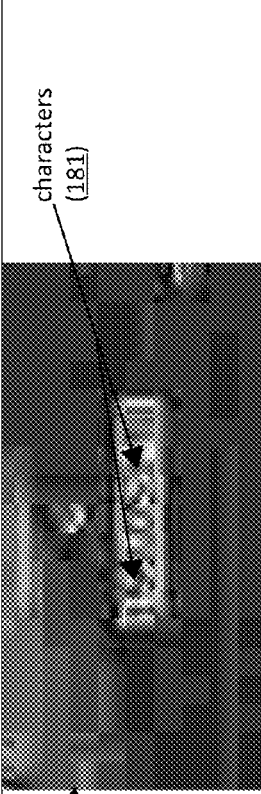 characters (181) | | |
|---|---|---|---|
| Character groupings (188) | Identification of characters in Distorted Image: First two digits | Identification of characters in Distorted Image: Middle three digits | Identification of characters in Distorted Image: Last two digits |
| Frame Probabilities (300) | Number: "56", Probability: 0.18390<br>Number: "59", Probability: 0.13796<br>Number: "55", Probability: 0.12361<br>Number: "58", Probability: 0.10280<br>Number: "66", Probability: 0.07959<br>Number: "50", Probability: 0.07344<br>Number: "69", Probability: 0.05661<br>Number: "68", Probability: 0.05265 | Number: "053", Probability: 0.26244<br>Number: "050", Probability: 0.08655<br>Number: "059", Probability: 0.08421<br>Number: "052", Probability: 0.08190 | Number: "19", Probability: 0.15260<br>Number: "18", Probability: 0.14229<br>Number: "16", Probability: 0.09133<br>Number: "15", Probability: 0.06567<br>Number: "10", Probability: 0.05946<br>Number: "36", Probability: 0.05073 |
| Most similar imitation image (undistorted) | 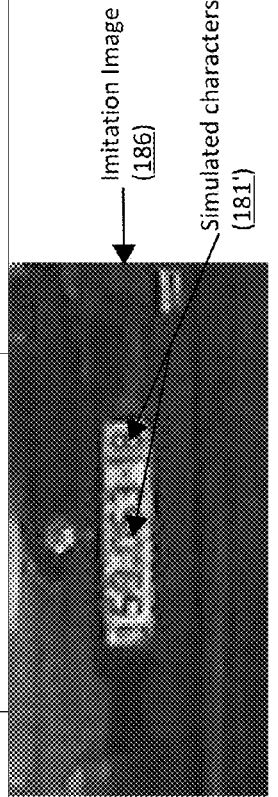 Imitation Image (186) Simulated characters (181') | | |

FIG. 3

Example 2 (5 frames, JPEG quality 20):

| Character groupings (188) | Identification of characters in Distorted Image: First two digits | Identification of characters in Distorted Image: Middle three digits | Identification of characters in Distorted Image: Last two digits |
|---|---|---|---|
| Frame 1 Probabilities | Number: "77", Probability: 0.23284<br>Number: "27", Probability: 0.06684 | - | Number: "71", Probability: 0.39754<br>Number: "33", Probability: 0.09926<br>Number: "11", Probability: 0.06307<br>Number: "37", Probability: 0.06166 |
| Frame 2 Probabilities | Number: "77", Probability: 0.20472<br>Number: "27", Probability: 0.07332<br>Number: "72", Probability: 0.06665<br>Number: "73", Probability: 0.06499 | - | Number: "28", Probability: 0.07950<br>Number: "29", Probability: 0.07208<br>Number: "39", Probability: 0.06226 |
| Frame 3 Probabilities | Number: "77", Probability: 0.36742<br>Number: "73", Probability: 0.17291<br>Number: "72", Probability: 0.13664 | - | Number: "71", Probability: 0.14656<br>Number: "33", Probability: 0.12045<br>Number: "73", Probability: 0.07053 |
| Frame 4 Probabilities | Number: "77", Probability: 0.10390 | - | Number: "78", Probability: 0.09673<br>Number: "77", Probability: 0.07802<br>Number: "79", Probability: 0.07729<br>Number: "75", Probability: 0.07501<br>Number: "33", Probability: 0.05571 |
| Frame 5 Probabilities | - | - | Number: "71", Probability: 0.53665<br>Number: "13", Probability: 0.24741 |
| Combined Probabilities | Number: "77", Probability: 0.99117 | Number: "137", Probability: 0.89188 | Number: "71", Probability: 0.99136 |
| Most similar imitation image (undistorted) | | | |

FIG. 4

Example 3 (5 frames, JPEG quality 50):

| Distorted images (183) | characters (181) | | |
|---|---|---|---|
| | Frame 1, Frame 2, Frame 3, Frame 4, Frame 5 | | |
| Character Groupings (188) | Identification of characters in Distorted Image: First two digits | Identification of characters in Distorted Image: Middle three digits | Identification of characters in Distorted Image: Last two digits |
| Frame 1 Probabilities | Number: "67", Probability: 0.16036<br>Number: "57", Probability: 0.12361<br>Number: "17", Probability: 0.08245<br>Number: "87", Probability: 0.07302 | - | Number: "13", Probability: 0.10385<br>Number: "87", Probability: 0.08734<br>Number: "67", Probability: 0.07298<br>Number: "57", Probability: 0.06892<br>Number: "12", Probability: 0.06777<br>Number: "17", Probability: 0.06767 |
| Frame 2 Probabilities | Number: "67", Probability: 0.22438<br>Number: "87", Probability: 0.12443<br>Number: "57", Probability: 0.11368<br>Number: "07", Probability: 0.06469<br>Number: "97", Probability: 0.06104 | - | Number: "51", Probability: 0.23191<br>Number: "13", Probability: 0.19879<br>Number: "61", Probability: 0.10695<br>Number: "12", Probability: 0.09602<br>Number: "11", Probability: 0.06881<br>Number: "01", Probability: 0.06257<br>Number: "19", Probability: 0.05387 |
| Frame 3 Probabilities | Number: "87", Probability: 0.18216<br>Number: "67", Probability: 0.13280<br>Number: "57", Probability: 0.06204<br>Number: "83", Probability: 0.06161 | - | Number: "61", Probability: 0.53884<br>Number: "51", Probability: 0.30748<br>Number: "01", Probability: 0.08053 |
| Frame 4 Probabilities | Number: "67", Probability: 0.23034<br>Number: "87", Probability: 0.14947<br>Number: "77", Probability: 0.14071<br>Number: "57", Probability: 0.13377<br>Number: "07", Probability: 0.07430<br>Number: "97", Probability: 0.07412<br>Number: "17", Probability: 0.05407 | - | Number: "65", Probability: 0.17637<br>Number: "63", Probability: 0.08730<br>Number: "61", Probability: 0.06144<br>Number: "03", Probability: 0.05347<br>Number: "55", Probability: 0.05316 |
| Frame 5 Probabilities | Number: "17", Probability: 0.08295<br>Number: "11", Probability: 0.05067 | - | Number: "11", Probability: 0.47505<br>Number: "61", Probability: 0.18324<br>Number: "01", Probability: 0.14844<br>Number: "51", Probability: 0.05484 |
| Combined Probabilities | Number: "67", Probability: 0.73404<br>Number: "87", Probability: 0.19499<br>Number: "57", Probability: 0.06489 | Number: "663", Probability: 0.49585<br>Number: "653", Probability: 0.15522<br>Number: "603", Probability: 0.10137<br>Number: "003", Probability: 0.06140<br>Number: "863", Probability: 0.05961 | Number: "61", Probability: 0.82036<br>Number: "11", Probability: 0.09155<br>Number: "51", Probability: 0.07052 |
| Most similar imitation image (undistorted) | | Imitation Image (186)<br>Simulated characters (181') | |

Probabilities' (300)

FIG. 5

CHARACTER RECOGNITION IN DISTORTED IMAGES

CROSS-REFERENCE TO RELATED APPLICATIONS

The present application is a US National Stage application of International Application No. PCT/IB2012/000065, filed Jan. 18, 2012, which claims the benefit of U.S. Patent Application Ser. No. 61/433,544, filed Jan. 18, 2011, each of which is hereby incorporated by reference in its respective entirety.

TECHNICAL FIELD OF THE INVENTION

This patent application relates generally to the field of character recognition and, in particular, to statistical methods for recognizing characters in distorted images.

BACKGROUND OF THE INVENTION

Optical character recognition (OCR) systems are employed in many fields and settings to identify characters within one or more images. For example, optical character recognition is commonly implemented for license plate recognition.

While known OCR systems are often capable of generating accurate recognition results when the characters being identified appear prominently and clearly within the images being processed, such systems are far less accurate when processing images of sub-optimal quality. For instance, it can be appreciated that many common scenarios can arise that result in an image (such as an image of a license plate) being distorted in one or more ways (due to the effects of motion, lighting inconsistencies, etc.). As such, existing OCR systems are frequently faced with distorted images that such systems are unable to process accurately. In such situations, these systems either a) process such images inaccurately or b) abstain from processing such images (thereby requiring either a human operator to perform manual recognition of the image, or else not performing any recognition of the image).

It is with respect to these and other considerations that the disclosure made herein is presented.

SUMMARY OF THE INVENTION

Technologies are presented herein in support of a system and method for recognizing characters within a distorted image. According to a first aspect, a method for recognizing one or more characters within a distorted image using a computing device is provided. The method includes rendering, with a processor executing code, an imitation image, applying one or more distortion models to the imitation image, thereby generating a distorted imitation image, comparing the distorted imitation image with the distorted image in order to compute a similarity between the distorted imitation image and the distorted image, and identifying the characters based on the similarity.

According to another aspect, a method for recognizing one or more characters within a distorted image using a computing device is provided. The method includes rendering, with a processor executing code, an imitation image, the imitation image comprising a simulation of the distorted image, comparing the imitation image with the distorted image by (i) simulating a distortion of the imitation image, and (ii) computing a similarity between the distorted simulation of the imitation image and the distorted image, and identifying the characters based on the similarity.

According to yet another aspect, a method for recognizing one or more characters within a distorted image using a computing device is provided. The method includes rendering, with a processor executing code, an imitation image, applying at least a first distortion model to the imitation image, thereby generating an initially distorted imitation image, comparing the initially distorted imitation image with the distorted image by (i) simulating a further distortion of the initially distorted imitation image, the further distortion comprising at least a second distortion model, and (ii) computing a similarity between the further distortion of the initially distorted imitation image and the distorted image, and identifying the characters based on the similarity.

According to another aspect, a method for processing a distorted data element using a computing device is provided. The method includes receiving the distorted data element, rendering, with a processor executing code, a plurality of imitation data elements, each of the imitation data elements comprising a unique undistorted simulation of the distorted data element, determining one or more distortion models to be applied to each of the imitation data elements, the one or more distortion models being applied based on at least one of: (i) metadata that corresponds to the distorted data element, (ii) a processing of the distorted data element in order to determine one or more distortion types present in the distorted data element, and (iii) a processing of one or more data elements related to the distorted data element in order to determine one or more distortion types present in the one or more data elements related to the distorted data element, applying the one or more distortion models to each of the imitation data elements, thereby generating a plurality of distorted imitation data elements, comparing each of the distorted imitation data elements with the distorted data element in order to compute a similarity between each respective distorted imitation data element and the distorted data element, comparing each of the computed similarities with one another in order to identify a most accurate simulation, and outputting at least one of: each of the computed similarities and the most accurate simulation.

According to yet another aspect, a method for processing a distorted data element using a computing device is provided. The method includes receiving the distorted data element, rendering, with a processor executing code, a plurality of imitation data elements, each of the imitation data elements comprising a unique undistorted simulation of the distorted data element, determining at least a first distortion model and a second distortion model to be applied to each of the imitation data elements based on at least one of: (i) metadata that corresponds to the distorted data element, (ii) a processing of the distorted data element in order to determine one or more distortion types present in the distorted data element, and (iii) a processing of one or more data elements related to the distorted data element in order to determine one or more distortion types present in the one or more data elements related to the distorted data element, applying at least the first distortion model to each of the imitation data elements, thereby generating a plurality of initially distorted imitation data elements, comparing each of the plurality of initially distorted imitation data elements with the distorted data element by (i) simulating a respective further distortion of each of the initially distorted imitation data elements, the respective further distortion comprising at least the second distortion model, and (ii) computing a similarity between each respective further distortion of each of the initially distorted imitation data elements and the distorted data element, based on the comparing, computing a similarity between each respective further distortion of each of the initially distorted imitation data elements and the distorted data element, comparing each of the computed similarities with one another in order to identify a most accurate simulation, and outputting at least one of: each of the computed similarities and the most accurate simulation.

According to another aspect, a method for processing a distorted data element using a computing device is provided. The method includes receiving the distorted data element, rendering, with a processor executing code, a plurality of imitation data elements, each of the imitation data elements comprising a unique undistorted simulation of the distorted data element, determining one or more distortion models to be applied to each of the imitation data elements, the one or more distortion models being applied based on at least one of: (i) metadata that corresponds to the distorted data element, (ii) a processing of the distorted data element in order to determine one or more distortion types present in the distorted data element, and (iii) a processing of one or more data elements related to the distorted data element in order to determine one or more distortion types present in the one or more data elements related to the distorted data element, applying the one or more distortion models to each of the imitation data elements, thereby generating a plurality of distorted imitation data elements, comparing each of the distorted imitation data elements with the distorted data element in order to generate a composite similarity between the distorted imitation data elements and the distorted data element, and outputting at least the composite similarity.

According to yet another aspect, a system is provided. The system includes one or more processors configured to interact with a computer-readable medium in order to perform operations including rendering, with a processor executing code, an imitation image, the imitation image comprising a simulation of a distorted image having one or more characters, applying one or more distortion models to the imitation image, thereby generating a distorted imitation image, comparing the distorted imitation image with the distorted image in order to compute a similarity between the distorted imitation image and the distorted image, and identifying the characters based on the similarity.

According to yet another aspect, a system is provided. The system includes one or more processors configured to interact with a computer-readable medium in order to perform operations including receiving a distorted data element, rendering, with a processor executing code, a plurality of imitation data elements, determining one or more distortion models to be applied to each of the imitation data elements based on at least one of: (i) metadata that corresponds to the distorted data element, (ii) a processing of the distorted data element in order to determine one or more distortion types present in the distorted data element, and (iii) a processing of one or more data elements related to the distorted data element in order to determine one or more distortion types present in the one or more data elements related to the distorted data element, applying the one or more distortion models to each of the imitation data elements, thereby generating a plurality of distorted imitation data elements, comparing each of the distorted imitation data elements with the distorted data element in order to compute a similarity between each respective distorted imitation data element and the distorted data element, comparing each of the computed similarities with one another in order to identify a most accurate simulation, and outputting at least one of: each of the computed similarities and the most accurate simulation.

According to another aspect, a computer storage medium encoded with a computer program is provided. The program includes instructions that when executed by a data processing apparatus cause the data processing apparatus to perform operations including rendering an imitation image, applying one or more distortion models to the imitation image, thereby generating a distorted imitation image, comparing the distorted imitation image with the distorted image in order to compute a similarity between the distorted imitation image and the distorted image, and identifying the characters based on the similarity.

According to yet another aspect, a computer storage medium encoded with a computer program is provided. The program includes instructions that when executed by a data processing apparatus cause the data processing apparatus to perform operations including receiving a distorted data element, rendering a plurality of imitation data elements, each of the imitation data elements comprising a unique undistorted simulation of the distorted data element, determining one or more distortion models to be applied to each of the imitation data elements based on at least one of: (i) metadata that corresponds to the distorted data element, (ii) a processing of the distorted data element in order to determine one or more distortion types present in the distorted data element, and (iii) a processing of one or more data elements related to the distorted data element in order to determine one or more distortion types present in the one or more data elements related to the distorted data element, applying the one or more distortion models to each of the imitation data elements, thereby generating a plurality of distorted imitation data elements, comparing each of the distorted imitation data elements with the distorted data element in order to compute a similarity between each respective distorted imitation data element and the distorted data element, comparing each of the computed similarities with one another in order to identify a most accurate simulation, and outputting at least one of: each of the computed similarities and the most accurate simulation.

These and other aspects, features, and advantages can be appreciated from the accompanying description of certain embodiments of the invention and the accompanying drawing figures and claims.

BRIEF DESCRIPTION OF THE DRAWINGS

FIGS. 3-5 illustrate various exemplary scenarios in which the methods and systems described herein are implemented.

DETAILED DESCRIPTION OF CERTAIN EMBODIMENTS OF THE INVENTION

Figure 1:
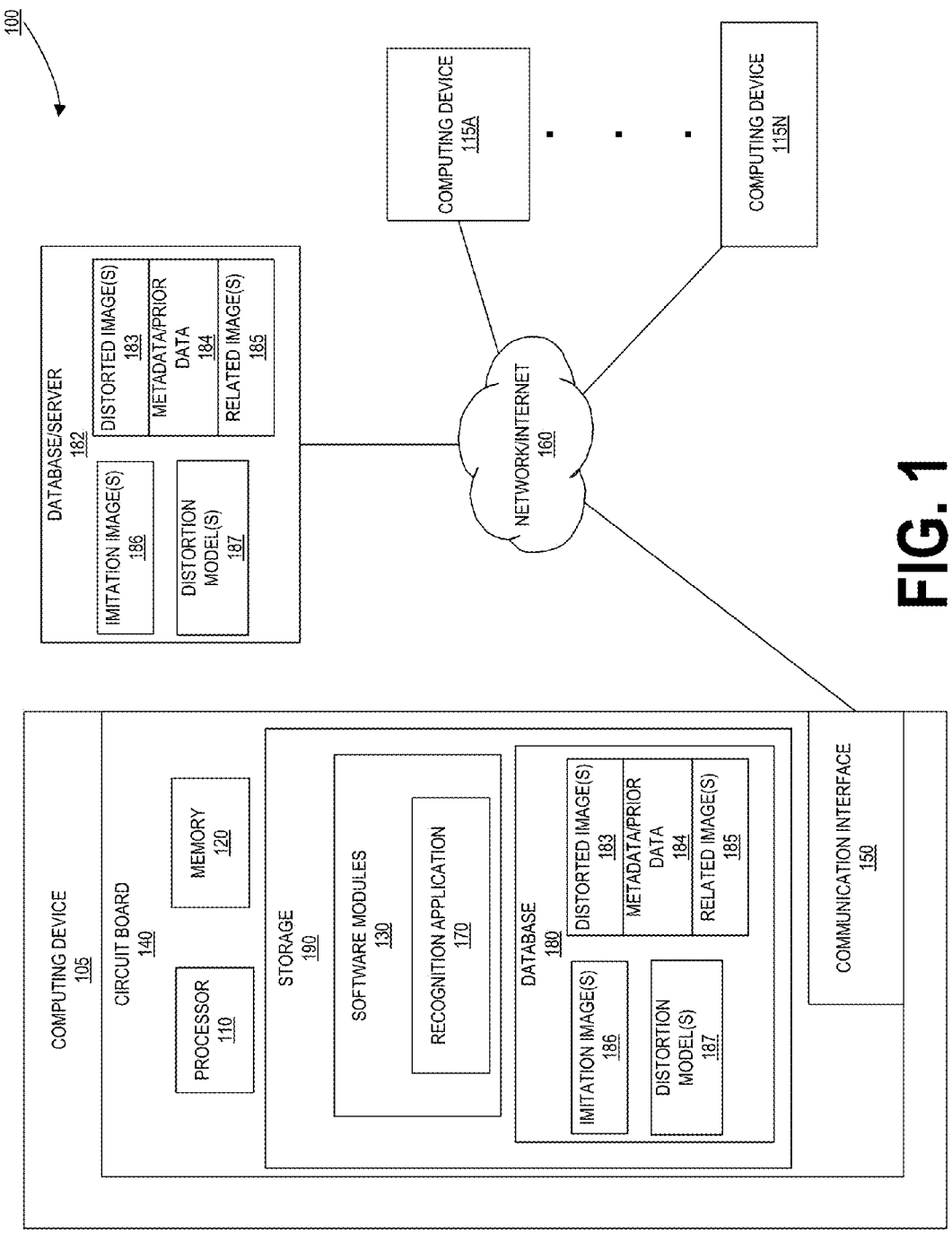
FIG. 1 is a high-level diagram illustrating an exemplary configuration of a recognition system.

By way of overview and introduction, various systems and methods are described herein that enable improved recognition of various types of distorted data elements or files, such as distorted images. It can be appreciated that conventional OCR techniques are often inadequate or useless when applied to images where considerable distortion (e.g., blur and/or compression) is present. Accordingly, such distorted images are processed inaccurately or not processed at all (without at least substantial user intervention). Moreover, in many cases such distorted elements are effectively entirely unintelligible, such that even a human reviewing such images is entirely incapable of recognizing any characters (or other such features) present within the distorted data element, such as a distorted image.

In an effort to improve recognition of such distorted images, the systems and methods described herein enable a series of operations whereby one or more estimations/identifications of various characters present within a distorted image can be attempted. These estimations/identifications can then be rendered in a manner that attempts to simulate how the distorted image might have appeared, if not for the distortion.

Certain further determinations can be made with regard to the distorted image, such as attempting to identify the various types of distortion present within the image(s). Corresponding models of such distortion(s) can subsequently be applied to the simulated image. In doing so, the present systems and methods essentially attempt to reconstruct a distorted image that is as close as possible to the original distorted image.

Having distorted the simulated image, the results of this distortion can be compared to the original distorted image. In the event that the simulated image as distorted is highly similar to the original distorted image, a determination can be made that characters present in the simulated image are also present in the distorted image. Thus, despite starting with an essentially unintelligible/unrecognizable distorted image, the present systems and methods can enable accurate recognition even of such distorted images.

The following detailed description is directed to systems and methods for recognizing one or more characters within a distorted image. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

The terms "distorted image," "distorted images," and "distorted image(s)" as used herein are intended to encompass one or more visual representations or files (such as computer readable picture/video files and/or video/image streams, such as those in the JPEG and MPEG format) that contain, reflect, and/or exhibit one or more distortions. Such distortions include, but are not limited to, any phenomenon, factor, model, and/or compression that cause an image, whether directly or indirectly, to be depicted and/or viewed in a sub-optimal fashion. In certain scenarios, such distortions result in one or more characters encompassed within an image to be distorted. Examples of such distorted image(s) include, but are not limited to, images containing blur (due to camera blur, motion or other reasons), lossy compression, interlacing, pixelization, image noise, atmospheric turbulence, and/or quantization.

The terms "distorted data element," "distorted data elements," and "distorted data element(s)" as used herein are intended to encompass one or more items or files (such as computer readable files and/or streams, such as those in practically any format such as audio signals/files and three-dimensional models/files) that contain, reflect, and/or exhibit one or more distortions. Such distortions include, but are not limited to, any phenomenon, factor, model, and/or compression that cause a data element, whether directly or indirectly, to be depicted, presented, projected, perceived, and/or viewed in a sub-optimal fashion. In certain scenarios, such distortions result in one or more aspects or features encompassed within an item or file to be distorted. Examples of such distorted data element(s) include, but are not limited to, audio signals/files containing one way deterministic distortion(s) (e.g., compression), and/or volume/noise distortions and three-dimensional models/files containing blur and/or compression distortions.

The terms "character," "characters," and "character(s)" as used herein are intended to encompass one or more symbols, letters (e.g., alphabetical characters), numbers, digits, logos, designs, shapes, and/or graphics, including but not limited to those customarily used in forming one or more sequences, strings, groupings and/or combinations of one or more of such symbols, letters, numbers, digits, logos, designs, shapes, and/or graphics, such as in various languages and/or conventions such as those used for identification purposes (e.g., a license plate standard).

The terms "imitation image," "imitation images," and "imitation image(s)" as used herein are intended to encompass one or more visual representations or files (such as computer readable picture or video files) that reflect information present in (or thought to be present in) another image, such as a distorted image. In certain implementations, such imitation images incorporate one or more simulated characters. Such simulated characters preferably correspond to characters present in (or thought to be present in) another image, such as a distorted image. Stated differently, imitation images are preferably images that reflect a simulation of the visual content present in (or thought to be present in) another image, such as a distorted image, in a manner that endeavors to factor out, to the greatest degree possible, the impact of various distortions at work in the distorted image.

The terms "distortion type," "distortion types," and "distortion type(s)" as used herein are intended to encompass one or more types of distortion that can be determined, identified, and/or perceived in a particular image or images, such as in a distorted image. Examples of such distortion types include, but are not limited to, blur (arising, for example, due to camera blur or motion), lossy compression, interlacing, pixelization, image noise, atmospheric turbulence, and quantization.

The terms "distortion model," "distortion models," and "distortion model(s)" as used herein are intended to encompass one or more models which, when applied to a particular image or images, result in such image being distorted in one or more particular way(s). In certain implementations, such distortion models preferably correspond to distortion types. Thus, for example, a blur distortion model can impose certain types of blur in an image, while a compression model can impose certain types of compression in an image. Examples of such compression types include, but are not limited to, JPEG, H.264, MPEG, etc. Moreover, in certain implementations various distortion parameters and/or parameter sets can dictate the degree and/or nature of a particular distortion model or models. For example, a distortion parameter can dictate the degree to which the blur model and/or the compression model is to be applied to a particular image (that is, how much and/or in what manner the image is to be blurred and/or compressed). Additionally, in certain implementations a single distortion model can encompass multiple individual distortion model(s) and/or distortion parameter(s). For example, a single distortion model can be defined and/or determined such that the distortion model incorporates a specific degree of blur and a specific degree of compression.

The terms "rendering parameters," "simulation parameters," and "rendering/simulation parameters" as used herein are intended to encompass one or more items, models, and/or values that can be considered and/or utilized during the process of rendering and/or simulating one or more images, such as in the manner described in detail herein. Such parameters are preferably estimated and/or identified through the processing of one or more distorted images, as will also be described in detail herein. In various scenarios, such parameters can be present within, reflected by, and/or related to such distorted images. Examples of such parameters include but are not limited to: estimations of one or more characters within a distorted image (e.g., obtained via known OCR methods), metadata (e.g., time, date, and/or location information relating to the distorted image), conditions and/or characteristics present in distorted image(s) 183 (e.g., fonts, sizes, shapes, colors, orientations, background patterns, and/or information/data on the surroundings of the characters, such as borders surrounding the characters, adjacent symbols of a known shape and/or the background of the characters, etc.).

An exemplary computer system is shown as a block diagram in FIG. 1 which is a high-level diagram illustrating an exemplary configuration of a recognition system 100. In one arrangement, computing device 105 can be a personal computer or server. In other implementations, computing device 105 can be a tablet computer, a laptop computer, or a mobile device/smartphone, though it should be understood that computing device 105 of recognition system 100 can be practically any computing device and/or data processing apparatus capable of embodying the systems and/or methods described herein.

Computing device 105 of recognition system 100 includes a circuit board 140, such as a motherboard, which is operatively connected to various hardware and software components that serve to enable operation of the recognition system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within recognition system 100. For instance, program code stored in a computer readable storage device in a server can be downloaded over a network from the server to recognition system 100.

Preferably, included among the software modules 130 is a recognition application 170 that is executed by processor 110. During execution of the software modules 130, and specifically the recognition application 170, the processor 110 configures the circuit board 140 to perform various operations relating to character recognition with computing device 105, as will be described in greater detail below. It should be understood that while software modules 130 and/or recognition application 170 can be embodied in any number of computer executable formats, in certain implementations software modules 130 and/or recognition application 170 comprise one or more applications that are configured to be executed at computing device 105 in conjunction with one or more applications or 'apps' executing at remote devices, such as computing device(s) 115A-N (collectively computing devices 115) and/or one or more viewers such as internet browsers and/or proprietary applications. Furthermore, in certain implementations, software modules 130 and/or recognition application 170 can be configured to execute at the request or selection of a user of one of computing devices 115 (or any other such user having the ability to execute a program in relation to computing device 105, such as a network administrator), while in other implementations computing device 105 can be configured to automatically execute software modules 130 and/or recognition application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as databases 180 and/or 182) can also be stored on storage 190, as will be discussed in greater detail below.

A communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as the Internet. Such connections can include a wired connection or a wireless connection (e.g. using the 802.11 standard) though it should be understood that communication interface 150 can be practically any interface that enables communication to/from the circuit board 140.

At various points during the operation of recognition system 100, computing device 105 can communicate with one or more computing devices 115A-N (collectively computing devices 115). The computing devices 115 transmit and/or receive data to/from the computing device 105, thereby preferably initiating maintaining, and/or enhancing the operation of the recognition system 100, as will be described in greater detail below. It should be understood that computing devices 115 can be in direct communication with computing device 105, indirect communication with computing device 105, and/or can be communicatively coordinated with computing device 105, as will be described in greater detail below. While computing device 115 can be practically any device capable of communication with computing device 105, in the preferred embodiment computing device 115 is a personal computer, server, handheld/portable computer, smartphone, personal digital assistant (PDA), tablet computer, and/or any other such computing device that is capable of transmitting and/or receiving data to/from computing device 105. It should also be appreciated that in many implementations, computing device 115 will be substantially identical, from a structural and functional perspective, to computing device 105.

It should be noted that while FIG. 1 depicts recognition system 100 with respect to computing devices 115A-N, it should be understood that any number of computing devices can interact with the recognition system 100 in the manner described herein. It should be further understood that a substantial number of the operations described herein are initiated by and/or performed in relation to such computing devices 115. For example, as referenced above, such computing devices 115 can execute applications and/or viewers which request and/or receive data from computing device 105, substantially in the manner described in detail herein.

In certain implementations, one or more external databases and/or servers 182 are also in communication with computing device 105. As will be described in greater detail below, database/server 182 is preferably a computing and/or storage device, and/or a plurality of computing and/or storage devices, that contain(s) information, such as distorted image(s) 183, metadata/prior data 184, related image(s) 185, imitation image(s) 186 and distortion model(s) 187 that can be relevant to the character recognition performed by computing device 105 as described in detail herein. Such external databases/servers 182 are in addition to the internal or local database 180 of computing device 105. It should be understood that databases 180 and 182 can, in many cases, contain similar, complimentary, and/or identical information. The primary distinction between database 180 and database 182 is that database 180 is local to computing device 105 (thus not requiring additional communication to access) while database 182 is external and thus requires communication between computing device 105 and database/server 182 in order to access the data stored therein. It should be noted that, as described in detail below, recognition system 100 can be configured such that various items (such as distorted images 183) can be stored at one location (such as at database 182), while various other related items (such as imitation images 186) can be stored at a second location (such as at database 180), as will be described in greater detail below.

At this juncture it should be noted that in certain implementations, such as the one depicted in FIG. 1, computing devices 115 and/or database/server 182 can be in periodic or ongoing communication with computing device 105 thorough a computer network such as the Internet 160. Though not shown, it should be understood that in certain other implementations, computing devices 115 and/or database/server 182 can be in periodic or ongoing direct communication with computing device 105, such as through communications interface 150.

In the description that follows, certain embodiments and/or arrangements are described with reference to acts and symbolic representations of operations that are performed by one or more devices, such as the recognition system 100 of FIG. 1. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the recognition system 100. Other components shown in FIG. 1 can be varied from the illustrative examples shown. The different embodiments can be implemented using any hardware device or system capable of running program code. In another illustrative example, recognition system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to computing device 105, computing devices 115A-N, and database/server 182 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the recognition system 100 and the various elements and components described above will be further appreciated with reference to the method for recognizing one or more characters within a distorted image as described below, in conjunction with FIGS. 2-5.

Figure 2:
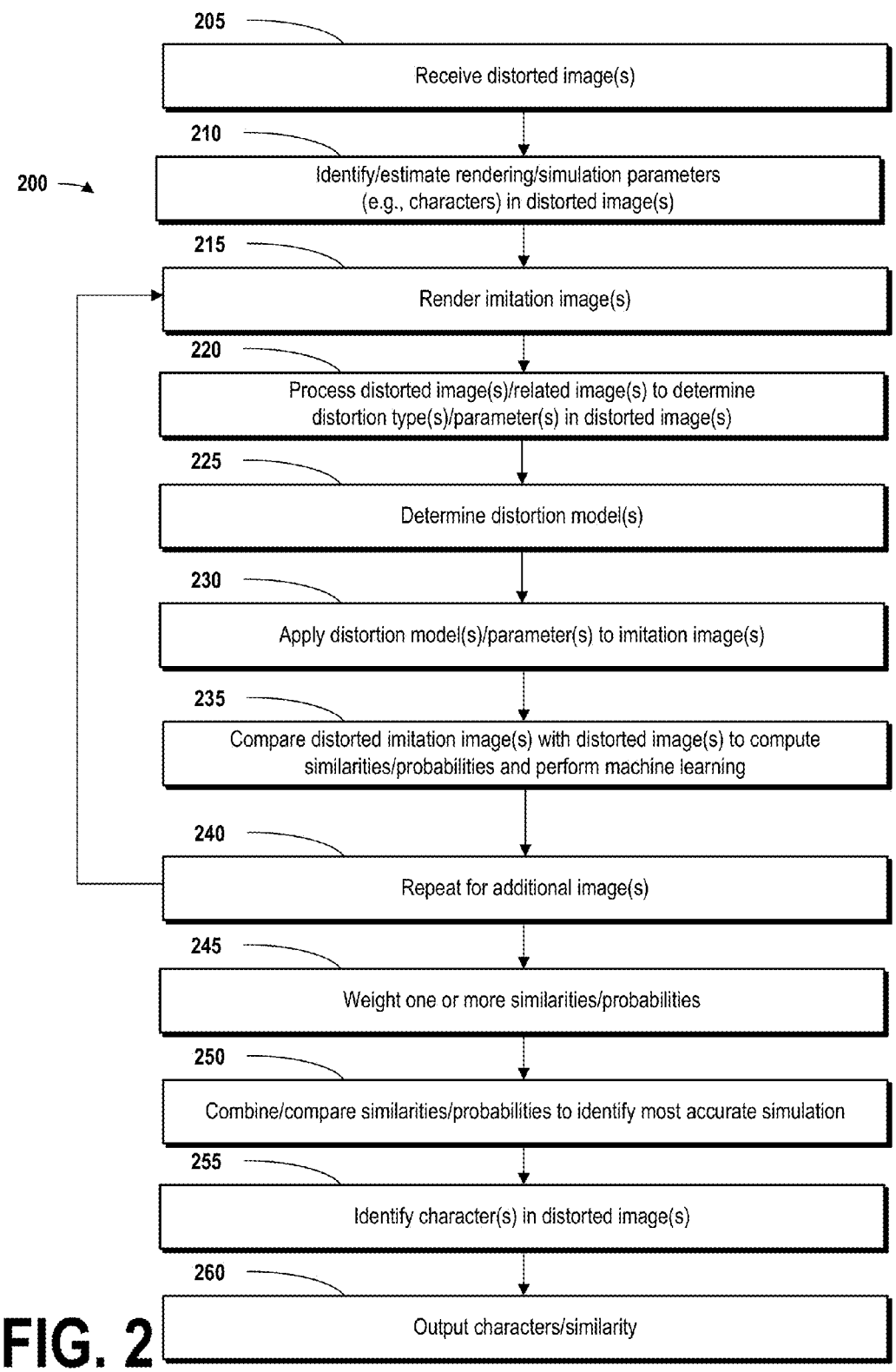
FIG. 2 is a flow diagram showing a routine that illustrates a broad aspect of a method for recognizing one or more characters within a distorted image in accordance with at least one embodiment disclosed herein.

Turning now to FIG. 2, a flow diagram is described showing a routine 200 that illustrates a broad aspect of a method for recognizing one or more characters within a distorted image in accordance with at least one embodiment disclosed herein. It should be appreciated that several of the logical operations described herein are implemented (1) as a sequence of computer implemented acts or program modules running on recognition system 100 and/or (2) as interconnected machine logic circuits or circuit modules within the recognition system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

It should be noted that routine 200 will be described with ongoing reference to FIGS. 3-5 which depict several exemplary scenarios that demonstrate various of the elements and processes referred to herein. For example, FIG. 3 depicts a scenario wherein a single distorted image 183 is recognized, while FIGS. 4-5 depict scenarios where multiple distorted images 183 are processed.

The process begins at step 205 where processor 110 executing one or more of software modules 130, including, preferably, recognition module 170, configures computing device 105 to receive one or more distorted image(s) 183, such as into memory 120. It certain implementations, such distorted image(s) 183 can be received from computing devices 115 and/or database 182 via network 160, and/or from database 180. For example, a remote device (e.g., computing devices 115 or a remote image capture device such as a security camera) can transmit one or more images to computing device 105 for processing. Examples of such distorted image(s) 183 are depicted in FIGS. 3-5 which depict various exemplary distorted image(s) 183 which reflect highly distorted images of automobile license plates. It should be noted that FIG. 3 depicts a single distorted image 183 while FIGS. 4-5 depict multiple distorted image(s) 183. It should also be understood that various information and/or data relating to distorted image(s) 183 can also be received, including but not limited to metadata/prior data 184 and related image(s) 185.

At step 210, processor 110 executing one or more of software modules 130, including, preferably, recognition module 170, configures computing device 105 to identify and/or estimate one or more rendering/simulation parameters that are present in and/or reflected by distorted image(s) 183. For example, in certain implementations distorted image(s) 183 can be analyzed and an initial estimation of the identity of the characters 181 present in the distorted image(s) 183 can be made by employing conventional OCR techniques on the distorted image(s) 183, as is known to those of ordinary skill in the art. By way of illustration, it can be appreciated that each of the various distorted images 183 depicted in FIGS. 3-5 contain multiple characters 181, though the identity of such characters may not be readily apparent. In other implementations, the characters in the distorted image(s) 183 can be identified and/or estimated using conventional OCR techniques in conjunction with prior data 184 that relates to the characters and/or the distorted image (e.g., a license plate standard that dictates that a license plate is made up of seven characters or numbers), and/or metadata that relates to the characters and/or the distorted image (e.g., time, date, and/or location information relating to the distorted image 183 that can indicate that a particular license plate standard is more likely to be present in the distorted image 183, image resolution information, information pertaining to the particular equipment or camera used to capture the image, etc.). In doing so, an initial attempt can be made at recognizing some portion of the characters within the distorted image, despite the fact that any recognition result may be imprecise on account of the distortion. By way of further illustration, in certain implementations other such rendering/simulation parameters can be estimated/identified, such as conditions and/or characteristics present in distorted image(s) 183, including but not limited to fonts, sizes, shapes, colors, orientations, background patterns, and/or information/data on the surroundings of the characters, such as borders surrounding the characters, adjacent symbols of a known shape and/or the background of the characters. It should also be noted that in other implementations, such as those where heavy distortion is present in the distorted image, no initial identification/estimation of the characters in the distorted image(s) 183 is performed. Additionally, in certain implementations, the referenced identification/estimation can be provided and/or received as a user input/selection as will be described in greater detail below, in a manner known to those of ordinary skill in the art. For example, a user can be presented with one or more distorted image(s) 183, and upon review of such images can provide one or more inputs/selections (such as to computing device 105) that reflect various identification(s)/estimation(s) relating to the content of the distorted image(s) 183.

At this juncture it should be noted that while the foregoing description refers to the identification/estimation of the various rendering/simulation parameters such as characters in the distorted image(s) 183 in a collective manner (that is, the characters are all identified during a single operation), in other implementations certain aspects of the identification/estimation of such characters (as well as any number of the various operations described in detail herein) can be performed on only a portion, set, and/or grouping 188 of the characters, and/or individually on the characters (e.g., one character at a time). Furthermore, in certain implementations the manner in which the identification of such characters are identified can be guided based on various factors and/or data, such as the quality of the distorted image(s) 183, and specifically the quality of the characters that can be identified in distorted image(s) 183. For example, each of the characters present in a relatively high quality image can be identified individually, while a group and/or all of the characters in a relatively low quality image can be identified together. By way of further example, one or more characters in the distorted image(s) can be grouped and identified together based on the presence of a defined spacing between one or more of the characters (e.g., a spacing of 100% of the width of a typical character, 75% of the width of a typical character, etc.). By way of yet further example, such groupings can be determined by the extent to which adjustment symbols among the characters affect each other (for example, due to blur, compression, and/or non-i.i.d. noise). Optionally, the determination of the characters in a single group is performed based on a known license plate format, irrespective of the content and/or quality of the distorted images 183. For example, as shown in FIGS. 3-5, character grouping 188 can be utilized to divide up the characters 188 present in a particular distorted image 183. It can be appreciated that in FIGS. 3-5, such groupings including: 1) the first two characters in the distorted image, 2) the middle three characters in the distorted image, and 3) the last two digits in the distorted image.

Then, at step 215, processor 110 executing one or more of software modules 130, including, preferably, recognition module 170, configures computing device 105 to render one or more imitation image(s) 186. It should be understood that such imitation image(s) 186 are preferably simulation(s) of the distorted image, such that they simulate how distorted image 183 would have been likely to appear if not for the distortion present in the image. FIGS. 3-5 depict examples of such imitation images 186, though it should be noted that while each of FIGS. 3-5 depicts a single imitation image 186, in many implementations multiple imitation images 186 will be rendered, as will be described in greater detail herein. Preferably, imitation image(s) 186 are rendered such that they include one or more simulated characters 181'. Such simulated characters 181' preferably correspond to one or more characters 181 that are present (or, at least, are estimated or assumed to be present, such as at step 210) within the distorted image 183. Moreover, such simulated characters as well as the imitation image 186 as a whole are preferably rendered in a manner that attempts to be as similar as possible to that of the distorted image(s) 183, incorporating and/or accounting for rendering/simulation parameters such as similar fonts, sizes, shapes, colors, orientations, background patterns, and/or information/data on the surroundings of the characters, such as borders surrounding the characters, adjacent symbols of a known shape and/or the background of the characters, such as those estimated/identified at step 210. It should also be noted that in certain implementations, multiple imitation images 186 are rendered, as will be described in greater detail below with respect to step 240. Additionally, it should be appreciated that in various implementations, the simulated characters can be rendered together, in various sets and/or groupings of characters, and/or individually. In certain implementations, such rendering can also account for certain external information/data, such as information (such as a license plate standard) that dictates which letters or numbers must be (or must not be) present in a license plate, the required font, font size, spacing, etc.

At step 220, processor 110 executing one or more of software modules 130, including, preferably, recognition module 170, configures computing device 105 to process distorted image(s) 183. In doing so, the presence of one or more types of distortion present in distorted image(s) 183 can be determined, as well as distortion parameters that reflect the degree and/or manner in which such distortion types are present in the distorted image(s) 183. This determination is preferably achieved through the user of various distortion estimation techniques as are known to those of ordinary skill in the art. Examples of such distortion types that can be present in distorted image(s) 183 include but are not limited to blur (arising due to camera blur, motion, or any number of other reasons), lossy compression, interlacing, pixelization, image noise, atmospheric turbulence, and/or quantization, while examples of such distortion parameters include but are not limited to the type and/or degree of blur and/or compression present in a particular distorted image 183. Moreover, in certain implementations the presence of certain types of distortion and/or the corresponding distortion parameters in distorted image(s) 183 can be determined based on metadata 184 that is associated with such distorted image(s) 183. For example, metadata 184 can include information on the type of compression applied to distorted image(s) 183, and the degree/manner in which it is applied (for example, a quantization table).

It should be noted that in certain implementations, one or more related image(s) 185 (that is, images that are related to distorted image(s) 183) can be processed in a substantially similar fashion, in order to determine the presence of one or more types of distortion and/or distortion parameters in such related image(s) 185. Examples of such related image(s) 185 include but are not limited to images that are captured from the same source (e.g., a camera) as distorted image 183 and individual frames from a video that are in close chronological proximity to a particular frame that is being processed as the distorted image 183. It can be appreciated that such related image(s) 185 are likely to contain distortion types and/or distortion parameters of the same or similar nature to that contained within distorted image(s) 183, and thus the processing of such related image(s) 185 can provide additional insight with regard to the determination of the types of distortion and/or the distortion parameters that are present within distorted image(s) 183.

It should also be understood that the determination of the types of distortion present in distorted image(s) 183 is not limited to a single type of distortion. Rather, any number of distortion types can be determined to be present within such distorted image(s) 183. Accordingly, it can be appreciated that each distortion type can further have one or more corresponding distortion parameters, as described in detail above.

Additionally, it should be noted that while the foregoing examples have illustrated the determination of the distortion type(s) and/or distortion parameter(s) within the distorted image(s) as being an automated process occurring at computing device 105, in certain implementations such determination(s) (or certain aspects thereof) can be performed by a human user. For example, distorted image(s) 183 can be presented to a user, and the user, by way of direct or indirect interaction with computing device 105, can provide one or more inputs and/or selections that reflect the types of distortion(s) and/or distortion parameters that the user has identified (e.g., blur, pixelation, etc., and degrees thereof) based on a review of the distorted image(s) 183. Moreover, in alternative implementations a hybrid approach can be utilized, wherein the distortion type(s) and/or distortion parameter(s) can be determined in an automated fashion, as described above, and such distortion type(s) can be displayed to a user for review and verification of such determination(s).

At step 225, processor 110 executing one or more of software modules 130, including, preferably, recognition module 170, configures computing device 105 to determine one or more distortion model(s) 187 and/or distortion parameters that are to be applied to imitation image(s) 186, as will be described in greater detail below. It should be understood that the distortion model(s) 187 that are to be applied preferably correspond to the distortion type(s) determined at step 220 to be present within distorted image(s) 183, while the distortion parameters preferably reflect the degree and/or manner in which such distortion model(s) 187 are to be applied. Thus, for example, if a certain degree of a particular type of compression and/or blur has been determined to be present within distorted image(s) 183, corresponding distortion model(s) 187 that reflect comparable types of compression and/or blur will be utilized in a comparable manner, preferably on the basis of one or more distortion parameters that reflect comparable degrees and/or manners of distortion. As will be described in greater detail below, by utilizing distortion model(s) 187 and/or distortion parameters that correspond to the distortion types and/or distortion parameters determined to be present within distorted image(s) 183, imitation image(s) 186 can ultimately be distorted (using such distortion model(s) 187 and/or distortion parameters) in a manner that preferably reflects the distortion present within distorted image(s) 183.

At this juncture, it should be understood that in certain implementations, multiple distortion model(s) 187 and/or distortion parameters can be applied to imitation image(s) 186. That is, it can be appreciated that in certain scenarios, such as those where a particular distorted image 183 is heavily distorted in one or more ways, it may be difficult to identify each of the distortion type(s) and/or distortion parameter(s) present in the distorted image 183. Accordingly, in order to account for various alternative possibilities with regard to the distortion type(s) and/or distortion parameter(s) that are present within the distorted image, multiple distortion model(s) 187, distortion parameters, and/or combinations of distortion model(s) and/or distortion parameters can be determined. It should be understood that each of such multiple distortion model(s) 187, distortion parameters, and/or combinations of distortion model(s) and/or distortion parameters represents one possibility as to the exact nature of the distortion present in the distorted image(s).

It should also be understood that in certain implementations the distortion model(s) 187 and/or distortion parameters that are to be applied to imitation image(s) 186 can be determined based on metadata 184 that corresponds to distorted image(s) 183. For example, metadata 184 can indicate that a particular type of compression has been applied to distorted image(s) 183 and/or the degree and/or manner in which it is applied (e.g., 20% compression, 40% compression, etc.). Based on this metadata 184, a corresponding distortion model 187 and/or distortion parameter can be utilized in a manner that results in a comparable degree of compression being applied to imitation image(s) 186, as will be described in greater detail below.

Then, at step 230, processor 110 executing one or more of software modules 130, including, preferably, recognition module 170, configures computing device 105 to apply one or more distortion model(s) 187 and/or distortion parameters to imitation image(s) 186. In doing so, one or more distorted imitation image(s) are generated, reflecting the substance of the imitation image(s) 186 after having distortion model(s) 187 and distortion parameters applied.

At step 235, processor 110 executing one or more of software modules 130, including, preferably, recognition module 170, configures computing device 105 to compare the distorted imitation image(s), such as those generated at step 230, with the distorted image(s) 183. In doing so, one or more similarities between the distorted imitation image and the distorted image 183 can be computed. In certain implementations, such similarities reflect degrees to which the distorted imitation image(s) and the distorted image(s) 183 are alike. In other implementations, such similarities reflect one or more probabilities that the simulated character(s) included in the imitation image are present in the distorted image and/or that the distorted imitation image is substantially identical to the distorted image 183. That is, it can be appreciated that, as described in detail above, the imitation image(s) 186 are preferably rendered as simulations that are intended to reflect how distorted image(s) 183 might have appeared if not for the distortion present in the image(s) 183, preferably including one or more simulated characters. Thus, upon distorting the imitation image(s) 186 in a manner that corresponds to the distortion determined to be present in the distorted image(s) 183 (such as at step 230), it is expected that the distorted imitation image(s) will bear a degree of similarity to the distorted image(s) 183. Accordingly, it can be appreciated that the degree to which the distorted imitation image(s) and the distorted image(s) 183 are similar also reflects the degree of likelihood and/or probability that the simulated character(s) (which were preferably included in the rendering of the imitation image(s) 186) are also present within the distorted image(s) 183. Examples of such similarities/probabilities 300 are depicted in FIGS. 3-5, showing the probabilities of various possible identities of the various characters 181 of distorted images 181.

At this juncture, it should be noted that while the forgoing description (e.g., step 230) has referred to the application of one or more distortion model(s) 187 and/or distortion parameters to an imitation image 186 (thereby generating a distorted imitation image) in certain implementations this process can be simulated, such as at step 235. That is, rather than actually generating such distorted imitation image(s) as at step 230, imitation images 186 can be processed together with the appropriate distortion model(s) 187 and/or distortion parameters (that is, those that correspond the distortion type(s) and/or distortion parameter(s) determined to be present in the distorted image(s) 183 and/or any related image(s) 185) during the referenced comparison operation. It can be appreciated that in certain scenarios, by simulating the distortion of the imitation image(s) 186 (as opposed to actually performing such distortion, as in step 230), certain processing efficiencies can result, while also ensuring the computation of similarities/probabilities that are comparable to those resulting from the comparison of a distorted imitation image with its corresponding distorted image 183, as described above.

Moreover, in certain other implementations, certain aspects of the referenced operations can be affirmatively performed (e.g., step 230, referring to the application of distortion model(s)/parameter(s) to imitation image(s)), while other aspects can be simulated, as described above. For example, in a scenario where both a blur distortion model/parameter(s) and a compression model/parameter(s) are to be applied to the imitation image(s), the blur distortion model/parameter(s) can be affirmatively applied to the imitation image(s) (such as in the manner described above at step 230) while the compression model/parameter(s) can be simulated, such as in the manner described above (e.g., at step 235). It should be understood that this illustration is merely exemplary and that effectively any distortion model/parameter(s) can be affirmatively applied (as at step 230), as well at simulated (as at step 235), as will be appreciated by those of ordinary skill in the art.

By way of illustration of the simulation of a distortion model/parameter(s), it can be appreciated that in certain implementations, such as those where the distortion is JPEG/MPEG compression and Gaussian noise, such similarities/probabilities can be computed by multiplying the probabilities of equality of each corresponding pair of 8×8 pixel DCT blocks from each of the imitation image(s) 186 and the distorted image(s) 183, in a manner known to those of ordinary skill in the art.

It can be appreciated that as the DCT transform is a linear orthonormal transform, a DCT transform of a block of a Gaussian independent noise results in DCT coefficients with Gaussian independent noise with the same parameters. Accordingly, in certain implementations, this fact can be utilized to find the probability that an 8×8 pixel block ($l_b$) of distorted image(s) 183 is equivalent to the corresponding block of the imitation image(s) 186 ($T_b$), after distortion by an additive Gaussian noise (models and parameters of which can be input at this step) and a JPEG compression (DCT transform, quantization and inverse DCT transform):

$$\left( y = Q(x), y_i = q_i \cdot \left\lfloor \frac{x_i}{q_i} \right\rfloor \right),$$

In cases when the simulated characters in imitation images 186 are not fully given (as, for example, a rendered license plate part cannot always be divided into an integer number of 8×8 pixel blocks) it can be assumed that the unknown pixels of the rendered license plate part have an intensity of a uniform distribution, or find the nearest block in terms of SSD between the known pixels that still fulfills the quantization constrains, in a manner known to those of ordinary skill in the art. Formally:

$$I_b = \underset{DT_b - \frac{q}{2} < DI_b < DT_b + \frac{q}{2}}{\operatorname{argmin}} \left( \sum_{\substack{known\ pixels \\ of\ T_b}} (I_b - T_b) \right)$$

In an alternative implementation, imitation image 186 can be distorted by full JPEG compression process and then compared with distorted image 183, such as by finding the sum of squared differences (SSD) between the images. The conversion from the SSD to probability is optionally performed by employing an approximation to a normal distribution of a JPEG compression of noised images, in a manner known to those of ordinary skill in the art.

It should also be noted that in certain implementations, one or more machine learning techniques and/or algorithms (e.g., artificial neural network, support vector machine, genetic programming, etc.) can be employed in a manner known to those of ordinary skill in the art. In doing so, while comparing the distorted imitation image(s), such as those generated at step 230, with the distorted image(s) 183, and determining the similarities/probabilities referenced above, such machine learning techniques can enable the identification of various aspects and/or trends with regard to the similarities (or lack thereof) between various distorted imitation image(s) and the distorted image(s) 183. Over a number of iterations, one or more rules or guidelines can be established on the basis of such machine learning that can serve to improve any number of the operations disclosed herein. By way of example, if a trend is perceived over time wherein many or all of the most accurate license plate identification results are made up of three letters followed by four numbers (e.g., FDX 3759, RHW 6338, etc.), attempts at identifying/estimating the rendering/simulation parameters such as characters within the $$P(I_b = D^{-1}(Q(D(T_b+n)))) = P(DI_b = Q(D(T_b+n))) \underset{x=Q(y) \Leftrightarrow x-\frac{q}{2} \leq y < x+\frac{q}{2}}{=} P\left(DI_b - \frac{q}{2} \leq D(T_b+n) < DI_b + \frac{q}{2}\right) \underset{Dn=n,\ see\ text}{=}$$

$$P\left(DI_b - \frac{1}{2} \leq DT_b + n < DI_b + \frac{q}{2}\right)$$

$$= P\left(DI_b - \frac{q}{2} - DT_b \leq n < DI_b + \frac{q}{2} - DT_b\right)$$

$$= \prod_i cdf_{N(0,\sigma^2)}\left(DI_b + \frac{q}{2} - DT_b\right)_i - cdf_{N(0,\sigma^2)}\left(DI_b - \frac{q}{2} - DT_b\right)_i$$

(60)

where $l_b$ is the 64-length vector of the image block pixel intensities, $T_b$ is the 64-length vector of the imitation image part pixel intensities, n is the 64-length vector of the image noise magnitudes (in intensity units, $n_i \sim N(0,\sigma^2)$), D is the DCT transform (multiplication by an orthonormal matrix), and Q is the quantization operator distorted image (e.g., at step 210) and the rendering of imitation image(s) (e.g., at step 215) can be adjusted to account for such perceived trends (e.g., potential identification attempts that would have otherwise been generated can be ignored if they do not meet this standard), thus further increasing the operational efficiency of the system.

At step 240, processor 110 executing one or more of software modules 130, including, preferably, recognition module 170, configures computing device 105 to repeat one or more of the steps referenced herein, including but not limited to steps 215-235. That is, it can be appreciated that a particular distorted image 183 can have one or more images, such as related image(s) 185 that bear certain degrees of relation to the particular distorted image. For example, one or more images captured in close chronological proximity to one another (e.g., adjacent or proximate frames within a video file) can share many common elements. As such, it can be further appreciated that repeating one or more of the referenced steps (e.g., steps 215-235) can process such images in a manner substantially similar to the way in which an initial image (i.e., the distorted image) was processed. In doing so, the processing of any particular additional image(s) can confirm and/or conflict with/differ from results generated by the processing of any other image(s). For example, with reference to both FIGS. 4-5, it can be appreciated that distorted images 183 include Frames 1-5. Thus, it can be appreciated that upon completion of the various operations described in detail above with regard to one of the frames, such operations can be repeated for another of the frames. In certain alternative implementations, such operations (that is, the processing of each of such frames individually) can be achieved in parallel through parallel processing, in a manner known to those of ordinary skill in the art.

Moreover, as noted above with respect to step 215, in certain implementations multiple imitation images 186 are rendered. Such implementations can be particularly effective in settings where a number of possibilities as to the identity of one or more of the characters present in the distorted image(s) 183 are estimated/identified. As described in detail above, when multiple imitation images 186 are rendered, each such imitation image 186 is preferably a simulation of distorted image 183 in a manner that simulates how distorted image 183 might have appeared if not for the distortion present in the image, including one or more simulated characters. However, in implementations where multiple imitation images 186 are rendered, it is preferable that each individual imitation image 186 be rendered with a unique set, combination, and/or grouping of simulated characters, each of which preferably reflects one of the number of possibilities as to the identity of one or more of the characters present in the distorted image(s) 183. It can be appreciated that by rendering each imitation image 186 with a unique set, combination, and/or grouping of simulated characters, each respective imitation image 186, when processed in the manner described herein, will return a different similarity/probability with regard to its equivalence with distorted image(s) 183, such as in the manner described in detail with respect to step 235. Accordingly, it can be further appreciated that by comparing such similarities/probabilities with one another, one or more greatest/best or most likely similarities/probabilities can be identified, as will be described in greater detail below. The unique set(s), combination(s), and/or grouping(s) of simulated characters present in the imitation images that are identified as having the greatest or most likely similarities/probabilities can thus be identified as the characters most likely to be present in distorted image(s) 183.

Moreover, in certain implementations, the various computed similarities/probabilities can be combined to form a single composite similarity/probability, in a manner known to those of ordinary skill in the art (for example, as illustrated in the 'Combined Probabilities' depicted in FIG. 4). By way of illustration, a respective probability can be computed for each set or grouping of characters/digits, together with the applied rendering/simulation parameters and distortion model(s)/parameter(s). Such respective probabilities (generated for each of the various combinations of characters/digits) can then be combined in order to generate a composite similarity/probability for each combination of characters/digits.

At step 245, processor 110 executing one or more of software modules 130, including, preferably, recognition module 170, configures computing device 105 to weight one or more of the similarities/probabilities, such as those computed at step 235. That is, in scenarios where multiple similarities/probabilities are computed (as referenced above with respect to step 240), one or more of such similarities/probabilities can be weighted in order to account for various additional information, factors, and/or considerations that can either increase or decrease the importance, value, and/or accuracy of a particular similarity/probability. By way of example, a certain distorted imitation image, when compared with distorted image(s) 183, might return a relatively low similarity/probability, indicating that the distorted imitation image is not particularly similar to the distorted image 183, and thus the simulated characters present in the distorted imitation image appear unlikely to be present in the distorted image 183. However, certain external information can indicate that the simulated characters present in the distorted imitation image have an increased likelihood of being present in the distorted image(s) 183 (for instance, if such simulated characters, such as a license plate prefix, correspond to a particular vehicle type that is more common than other vehicle types). In such a scenario, despite the objective unlikelihood (based solely on the comparison of the distorted imitation image and the distorted image(s) 183) that the simulated characters in the distorted imitation image are present in the distorted image(s) 183, this similarity/probability result can be ascribed increased importance (that is, a weighting) that reflects the fact that this result also has a greater likelihood of accuracy based on certain external information, as described above.

At step 250, processor 110 executing one or more of software modules 130, including, preferably, recognition module 170, configures computing device 105 to compare and/or combine each of the computed similarities/probabilities (such as those computed at step 235, particularly in scenarios where multiple similarities/probabilities are computed) with one another. In certain implementations, the similarities/probabilities can be normalized for all possible sets of characters (such as in a license plate) such that their sum is 1, over all parameter sets. Based on the comparison and/or combination of the computed similarities/probabilities, one or more most accurate similarities/probabilities can be identified.

Then, at step 255, processor 110 executing one or more of software modules 130, including, preferably, recognition module 170, configures computing device 105 to identify the characters in the distorted image 183 based on the similarity/probability. That is, based on the most accurate similarities/probabilities, such as those identified at step 250, the characters present in the distorted image 183 can be identified. Preferably, such characters are identified as equivalent characters to the simulated characters present in the imitation image(s) 186 that was/were ultimately determined to be most similar to the distorted image, on the basis of the various operations and processes described herein. As noted above, given the similarity between the distorted imitation image(s) and the distorted image(s) 183, it can be concluded that the absence of such distortions in distorted image(s) 183 would result in an image comparable to the imitation image(s) 186 on whose basis the distorted imitation images (which the distorted image(s) 183 was/were determined to be most similar to) were generated. And, being that such imitation image(s) 186 were rendered to include certain simulated characters, it can be further concluded that the characters in the distorted image(s) 183 (which previously could not be recognized with any degree of accuracy, if at all) are equivalent to those simulated characters included in the referenced imitation image(s) 186.

At step 260, processor 110 executing one or more of software modules 130, including, preferably, recognition module 170, configures computing device 105 to output the characters and/or the similarities. That is, in certain implementations the simulated characters that were identified as being the characters in distorted image(s) 183 (such as at step 255) can be displayed, such as at a display device (not shown) or otherwise output or transmitted, while in other implementations the imitation images that incorporate such simulated characters (and thus can be understood to be the most accurate rendering of what distorted image(s) 183 might look like without the presence of distortion in the distorted image(s)) can be similarly displayed or otherwise output or transmitted. Similarly, in other implementations various aspects of the various similarities and/or probabilities (such as tables, charts, and/or lists, such as those depicted in FIGS. 3-5, depicting the various similarities and/or probabilities as computed during the process described in detail above, such as at steps 235 and/or 250.

At this juncture, it should be noted that although much of the foregoing description has been directed to systems and methods for recognizing characters within a distorted image, the systems and methods disclosed herein can be similarly deployed and/or implemented in scenarios, situations, and settings far beyond the referenced scenarios. It can be readily appreciated that recognition system 100 can be effectively employed in practically any scenario where improved recognition of distorted data is of value. It should be further understood that any such implementation and/or deployment is within the scope of the systems and methods described herein.

For example, the systems and methods described herein can be readily adapted to enhance recognition of various audio signals and/or files. It can be appreciated that various audio recognition techniques can be performed on audio signals and/or files, such as DTMF recognition and/or speech recognition, as are known to those of ordinary skill in the art. However, it can be further appreciated that various types of distortion can be present in such audio signals and/or files, such as compression and/or volume distortion. Traditionally, the presence of such distortion resulted in an inability to achieve accurate recognition results using conventional recognition techniques. However, using the methods and systems described herein, accurate recognition processing can be performed on such distorted audio signals and/or files, substantially in the manner described in detail above with regard to FIG. 2. As will be apparent to those of ordinary skill in the art, the various operations described with regard to FIG. 2 can be adapted and/or configured such that they operate on audio signals and/or files, as opposed to images. It can also be appreciated that in such an implementation, the various distorted image(s) 183, metadata/prior data 184, related image(s) 185, imitation image(s) 186, and distortion model(s) 187 are similarly adapted and/or configured to correspond to appropriate audio signal/file related elements. In doing so, it can be appreciated that a distorted audio signal/file can be processed by generating one or more imitation audio signals/files, applying one or more distortion models and/or distortion parameters to such imitation audio signals/files, and comparing/combining the results of the distortion of the imitation audio signals/files with the distorted audio signals/files to compute similarities/probabilities that indicate which of the imitation audio signals/files are most similar to the distorted audio signals/files, thereby enabling an accurate recognition of the distorted audio signals/files, substantially in the manner described in detail above with regard to distorted image(s) and depicted in FIG. 2.

By way of further example, the systems and methods described herein can be readily adapted to enhance recognition of various three-dimensional models and/or files. It can be appreciated that various three-dimensional recognition techniques can be performed on three-dimensional models and/or files, such as three-dimensional car image rendering(s), as are known to those of ordinary skill in the art. However, it can be further appreciated that various types of distortion can be present in such three-dimensional models and/or files, such as blur and camera distortion. Traditionally, the presence of such distortion resulted in an inability to achieve accurate recognition results using conventional recognition techniques. However, using the methods and systems described herein, accurate recognition processing can be performed on such distorted three-dimensional models and/or files, substantially in the manner described in detail above with regard to FIG. 2. As will be apparent to those of ordinary skill in the art, the various operations described with regard to FIG. 2 can be adapted and/or configured such that they operate on three-dimensional models and/or files. It can also be appreciated that in such an implementation, the various distorted image(s) 183, metadata/prior data 184, related image(s) 185, imitation image(s) 186, and distortion model(s) 187 are similarly adapted and/or configured to correspond to appropriate three-dimensional model/file related elements. In doing so, it can be appreciated that a distorted three-dimensional model/file can be processed by generating one or more imitation three-dimensional models/files, applying one or more distortion models and/or distortion parameters to such imitation three-dimensional models/files, and comparing/combining the results of the distortion of the imitation three-dimensional models/files with the distorted three-dimensional models/files to compute similarities/probabilities that indicate which of the imitation three-dimensional models/files are most similar to the distorted three-dimensional models/files, thereby enabling an accurate recognition of the distorted three-dimensional model/file, substantially in the manner described in detail above with regard to distorted image(s) and depicted in FIG. 2.

It can be appreciated that a practically unlimited number of additional examples, scenarios, and applications exist that can benefit from the recognition systems and methods described herein. Several such applications are in forensic settings (e.g., analyzing an image or a video of a vehicle in which the license plate cannot be recognized by a human because of image distortion due to blur, noise, compression, and other factors, but the license plate standard is known, as described herein), standard license plate recognition (e.g., electronic toll collection, etc.), shipping container label recognition, plane label recognition, logo recognition, painting recognition, and facial recognition.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins)

that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for improved recognition processing. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method comprising:
   (a) prior to rendering an imitation image, estimating one or more rendering parameters from a distorted image;
   (b) rendering, by a processor the imitation image, the imitation image comprising one or more simulated characters that correspond to one or more characters within the distorted image;
   (c) applying one or more distortion models to the imitation image, thereby generating a distorted imitation image;
   (d) comparing the distorted imitation image with the distorted image to compute a similarity between the distorted imitation image and the distorted image; and
   (e) identifying the one or more characters as the one or more simulated characters based on the similarity.

2. The method of claim 1, wherein the imitation image is rendered based on at least one standard.

3. The method of claim 2, wherein the standard is a license plate standard.

4. The method of claim 1, wherein the rendering parameters are estimated based on at least one of: an estimation of the characters, prior data relating to at least one of the characters and the distorted image, or metadata relating to at least one of the characters and the distorted image.

5. The method of claim 1, further comprising: prior the applying, determining the one or more distortion models to be applied to the imitation image based on metadata that corresponds to the distorted image.

6. The method of claim 5, wherein the metadata comprises at least one of a compression type and compression parameters.

7. The method of claim 1, further comprising: processing the distorted image to determine one or more distortion types present in the distorted image.

8. The method of claim 7, wherein the one or more distortion models applied to the imitation image correspond to the one or more distortion types present in the distorted image.

9. The method of claim 1, further comprising: processing one or more images related to the distorted image to determine one or more distortion types present in the one or more images related to the distorted image.

10. The method of claim 9, wherein the one or more distortion models applied to the imitation image correspond to the one or more distortion types present in the one or more images related to the distorted image.

11. The method of claim 1, wherein the one or more simulated characters account for at least one of: viewing angle, color, size, space between characters or imaging model.

12. The method of claim 1, wherein the one or more distortion models comprise at least one of: a blur model, a lossy compression model, an interlacing model, a pixelization model, a image noise model, an atmospheric turbulence model, or a quantization model.

13. The method of claim 1, wherein the distorted image comprises a plurality of distorted images, the method further comprising: repeating (b)-(d) for each of a plurality of distorted images.

14. The method of claim 13, further comprising: comparing each of the computed similarities with one another to identify a most accurate simulation.

15. The method of claim 13, further comprising: combining the computed similarities in order to identify a most accurate simulation.

16. The method of claim 1, wherein the distorted image comprises a plurality of distorted images, the method further comprising: repeating (b)-(c) for each of a plurality of distorted images, wherein the comparing comprises comparing each of the distorted imitation images generated at the each respective iteration of (c) with the distorted images in order to compute a composite similarity across the distorted imitation images and the distorted images.

17. The method of claim 1, wherein the similarity comprises a probability that the one or more simulated characters are present in the distorted image.

18. The method of claim 13, wherein the similarity comprises a probability that the one or more simulated characters are present in the distorted images.

19. A system comprising one or more processors configured to:
- (a) render an imitation image, the imitation image comprising one or more simulated characters that correspond to one or more characters within a distorted image;
- (b) apply at least a first distortion model to the imitation image, thereby generating an initially distorted imitation image;
- (c) compare the initially distorted imitation image with the distorted image by
  - i. simulating a further distortion of the initially distorted imitation image, the further distortion comprising at least a second distortion model, and
  - ii. computing a similarity between the further distortion of the initially distorted imitation image and the distorted image, the similarity comprising a probability that the one or more simulated characters are present in the distorted image; and
- (d) identify the one or more characters as the one or more simulated characters based on the similarity.

20. A non-transitory computer-readable medium comprising instructions that, when executed by a processing device, cause the processing device to:
- (a) receive a distorted data element;
- (b) render a plurality of imitation data elements, each of the imitation data elements comprising a unique undistorted simulation of the distorted data element;
- (c) determine one or more distortion models to be applied to each of the imitation data elements, the one or more distortion models being applied based on at least one of:
  - i. metadata that corresponds to the distorted data element,
  - ii. a processing of the distorted data element in order to determine one or more distortion types present in the distorted data element, or
  - iii. a processing of one or more data elements related to the distorted data element in order to determine one or more distortion types present in the one or more data elements related to the distorted data element;
- (d) apply the one or more distortion models to each of the imitation data elements, thereby generating a plurality of distorted imitation data elements;
- (e) compare each of the distorted imitation data elements with the distorted data element in order to compute a similarity between each respective distorted imitation data element and the distorted data element;
- (f) compare each of the computed similarities with one another to identify a most accurate simulation; and
- (g) output at least one of: each of the computed similarities or the most accurate simulation.

21. The non-transitory computer-readable medium of claim 20, wherein the distorted data element comprises at least one of an audio file or a three-dimensional model.

* * * * *